United States Patent [19]

Meyer et al.

[11] 4,089,598
[45] May 16, 1978

[54] PHONOGRAPH DEVICE

[75] Inventors: Burton C. Meyer, Downers Grove; Alex Imatt, Chicago; Derek R. Brand, Naperville, all of Ill.

[73] Assignee: Marvin Glass & Associates, Chicago, Ill.

[21] Appl. No.: 761,293

[22] Filed: Jan. 21, 1977

[51] Int. Cl.² .................. G03B 21/30; G03B 31/06; G03B 23/10
[52] U.S. Cl. .................................. 353/17; 40/456; 350/255; 353/101; 353/110
[58] Field of Search ............... 353/16, 17, 18, 110, 353/101; 352/2, 102, 103; 40/28.2; 350/245, 246, 255, 256

[56] References Cited

U.S. PATENT DOCUMENTS

| | | | |
|---|---|---|---|
| 2,203,437 | 6/1940 | Levy | 352/103 |
| 2,683,390 | 7/1954 | Steele | 353/16 |
| 3,134,298 | 5/1964 | Vokholz | 353/101 |
| 3,237,328 | 3/1966 | Tritt | 40/28.2 |
| 3,496,851 | 2/1970 | Himmelsbach | 350/255 |

Primary Examiner—Steven L. Stephan
Attorney, Agent, or Firm—Mason, Kolehmainen, Rathburn and Wyss

[57] ABSTRACT

An audio-visual phonograph device including a visual image projection system is provided which includes a case for the phonograph device having a lid that serves as a screen for the projection of images formed on a flat disc. The phonograph device further includes a variable speed turntable and a pick-up tone arm employed to reproduce the audio message on the records. The turntable is synchronized with a carrier onto which the visual image disc is removably mounted. The carrier rotates in synchronism with the turntable advancing a continuous image that is projected onto the screen in a timed relation with the correlated audio message.

14 Claims, 6 Drawing Figures

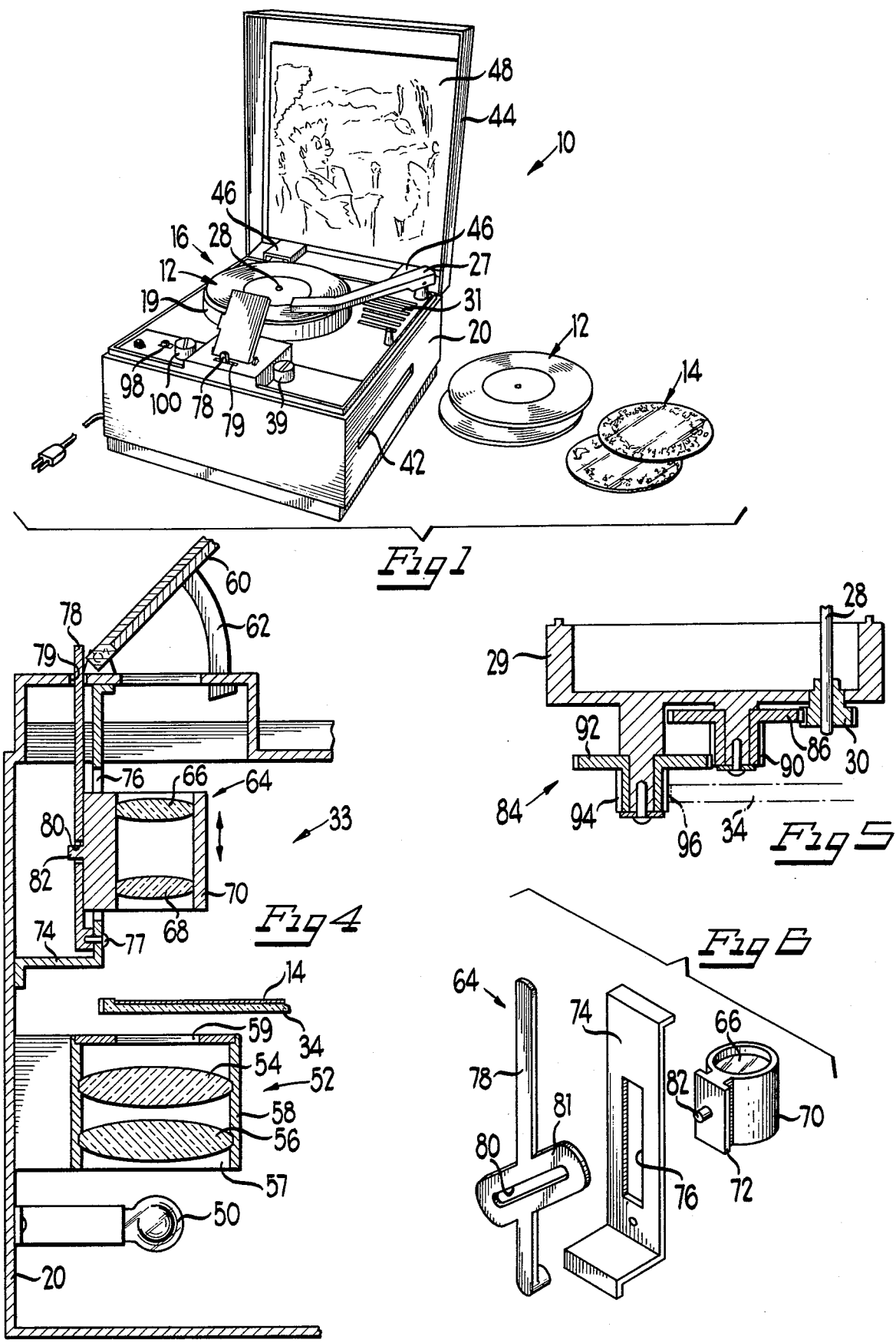

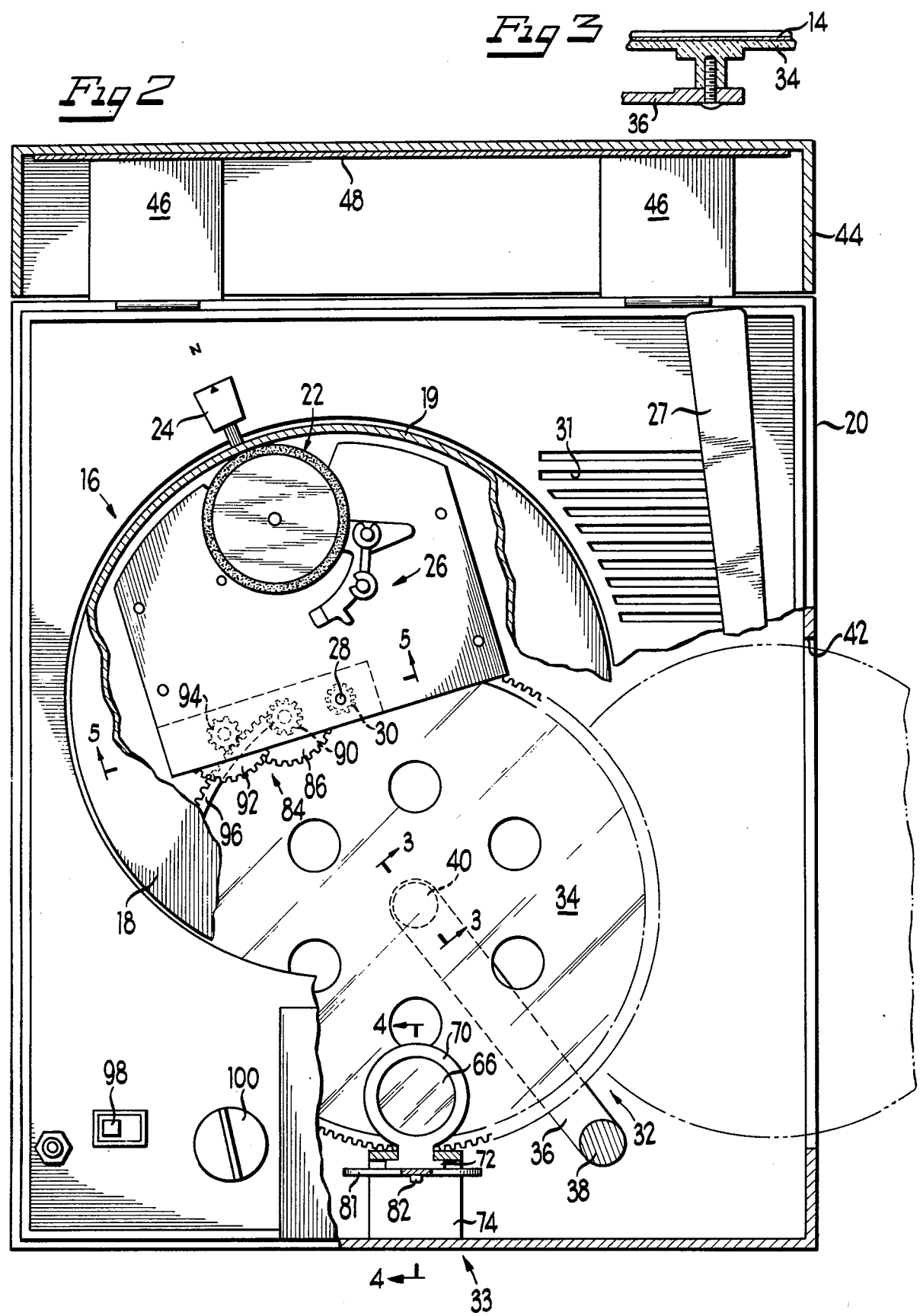

PHONOGRAPH DEVICE

BACKGROUND OF THE INVENTION

1. Field of the Invention

The present invention relates to an audio-visual device, and particularly to a phonograph device including a visual image projector wherein the phonograph turntable and image projector are mechanically synchronized such that a visual image is displayed in synchronism with a correlated audio message.

2. Description of the Prior Art

It is desirable to provide a phonograph device adapted for use by children that displays an image in synchronism with the playing of a record. For this use the phonograph device should preferably be inexpensive and durable.

Typical prior art phonographs with visual image projectors display a picture on a side or back or the casing of the phonograph. These visual images or pictures are typically projected from discrete slides or frames printed on a film strip or similar media. These slides are incrementally advanced by a mechanism that is synchronized with the playing of a record; however, these incremental images are not continuous thereby substantially reducing the realism of the visual story portrayed. Moreover, the complex advancement mechanism employed in these prior art devices to advance the slide incrementally is complex both in operation and construction. In addition, the projection of the image onto a screen defined on a side of the housing of the device requires the placement of the toy on a surface that is elevated, such as a table, so as to provide a convenient angle of observation for the child.

SUMMARY OF THE INVENTION

An object of the present invention is to provide a new and improved phonograph device that includes a visual image or picture projector that projects a continuously moving image onto a screen in synchronism with a record played on the phonograph.

Briefly, the above and other objects and advantages of the present invention are achieved by providing a new and improved phonograph device with a projector that includes a housing with a hinged cover. The cover includes suitable reflective material on one surface that serves as a screen for a projected image.

Mounted within the housing is a typical phonograph turntable and tone arm that are employed to play records in the usual manner. Also mounted within the housing is an image projector that includes a carrier having a plate configuration that serves to carry or hold a visual image disc. The image disc includes on its surface, in a continuous fashion, several images that portray a story. The story depicted by the images corresponds to a story recorded on a record that may be played on the phonograph. The carrier is mounted so as to allow it to be swung to a position outside of the housing whereupon the image disc may be mounted on the carrier plate. When positioned in the housing, a portion of the carrier is aligned with a lamp that functions to project the continuous images on the disc onto the screen.

The carrier plate includes a gear section on its outer periphery that engages a gear assembly coupled to the turntable. Through the employment of the gear assembly and its mechanical connection to the turntable and the carrier plate, rotation of the turntable is imparted at a reduced rate to the carrier plate. In this manner, the story contained on a record played during operation of the phonograph is synchronized with the images that are projected on the inside of the cover.

The image projector, in addition to the lamp, includes a selectively movable lens assembly that focuses the image on the disc onto a mirror mounted on the housing which reflects the image onto the screen. The lens assembly includes a frame movably mounted by an inclined cam surface defined on a pivoted lever. Movement of the lever in a first direction results in movement of the lens frame and lens assembly thereby permitting manual focusing of the projected image onto the screen or cover.

BRIEF DESCRIPTION OF THE DRAWINGS

The present invention together with the above and other objects and advantages will best appear from the following detailed description of an illustrative embodiment of the invention shown in the accompanying drawings, wherein:

FIG. 1 is a perspective view of a phonograph device including a visual image projection system constructed in accordance with the present invention;

FIG. 2 is an enlarged, fragmented, top plan view of the phonograph device illustrated in FIG. 1;

FIG. 3 is a vertical section of the carrier taken generally along line 3—3 of FIG. 2;

FIG. 4 is another vertical section of the lens and focusing assembly taken generally along line 4—4 of FIG. 3;

FIG. 5 is a vertical section taken generally along the line 5—5 of FIG. 2; and

FIG. 6 is an exploded perspective view of the focusing assembly of the phonograph device.

DESCRIPTION OF THE PREFERRED EMBODIMENT

Having reference now to the drawings, there is illustrated a phonograph device including a visual image or picture projector generally designated by the reference numeral 10. The phonograph device 10 is employed to tell a story both visually and by sound and is particularly adapted for enjoyment and use by a child. The phonograph device 10 is a compact including all the necessary reproduction and projection components and is of a durable construction to withstand use by children.

The phonograph device 10 is adapted to play a record such as one of the records 12 that has sound recorded thereon thereby providing audio information corresponding to a desired story. In addition, the phonograph device 10 is adapted to employ visual image discs designated by the reference numeral 14 that are transparent and have images imprinted in a continuous manner along their outer peripheries.

The phonograph device 10 through the employment of the records 12 and the discs 14 operates to synchronize the sound recorded on the records 12 with the images printed on the discs 14 to display a visual story, the action of which corresponds with the recording as it is played from the record.

More specifically, the phonograph device 10 includes a phonograph generally designated by the reference numeral 16. The phonograph includes a turntable 18 rotatably mounted within a housing or casing 20 defining the outer frame thereof. As is known in the art, the turntable 18 is driven by a friction drive wheel 22, connected to a motor (not shown), in engagement with the skirt 19 of the turntable 18 (FIG. 2). The drive wheel 22 may be adjusted to the desired speed by a speed selection lever 24 that functions to shift the speed assembly 26 which engages various diameters of the friction wheel 22 thereby varying the speed of the turntable 18 in accordance with the speed of the record 12.

The turntable 18 is rotatably mounted by a spindle 28 that is, in turn, rotatably mounted in a rectangular frame 29 by a gear 30 (FIG. 5) secured to the spindle 28 for rotation therewith. In this manner, the spindle 28 and thus the turntable 18 are rotated in accordance with the selected speed of the wheel 22.

In order to pick-up and amplify the sound recorded on the record 12, the phonograph 16 includes a tone arm 27. The tone arm 27, as is known in the art, is employed to play a record 12 and transmit and amplify the sound to a listener through a speaker (not shown) mounted behind the grill 31. The phonograph device 10 includes the necessary electric circuitry for reproducing and amplifying the recorded sound as is known in the art and for simplicity is not illustrated. The phonograph 16 through the employment of the turntable 18, the tone arm 27, the associated circuitry and amplification devices provides the sound portion of a story.

The visual portion of each recorded story is provided by a picture projector portion generally designated by the reference numeral 33 (FIG. 4). This portion of the phonograph device 10 employs the discs 14 previously described. To mount the discs 14 within the phonograph device 10 in a manner such that the images on the discs may be displayed, the phonograph device 10 includes a carrier assembly generally designated by the reference numeral 32 (FIG. 2). The carrier assembly 32 serves to mount or carry an image disc 14 and to align the images imprinted on the image disc 14 with the projector portion 33 so as to project the images in accordance with the principles of the phonograph device 10. In addition, the carrier assembly 32 serves to rotate the images printed on the image disc 14 through the projector 33 so as to display a continuous series of images that correspond with or are synchronized with the story recorded on the record 12 and played by the phonograph 16.

The carrier assembly 32 includes a transparent platen 34 onto which the image discs 14 may be mounted. The platen 34 is mounted on a cantalevered lever or arm 36 that is pivotally mounted at one end 38 to the housing 20 of the toy 10. The other end 40 of the arm 36 rotatably mounts the platen 34. Due to the pivotal connection of the arm 36 to the housing 20, the platen 34 may be swung from a position within the housing 20, as shown with solid lines, through a slot 42 defined on the side of the housing 20 to a point outside of the housing 20 as shown in phantom lines. In this latter position an image disc 14 may be positioned onto the platen 34. The disc 14 is mounted on the platen 34 such that the first image or title of the story to be portrayed is at a preselected position on the platen 34. This first image corresponds to the first portion of the story recorded on the selected record 12. The positioning of the selected image disc 14 on the carrier platen 34 may be accomplished in a manner well known in the art. For example, the platen 34 may include a spindle (not shown) having a key that corresponds to a keyway defined in the center of the image disc 14. Another manner of mounting includes a printed arrow or line on the disc 14 that is aligned with a similar line or arrow on the housing 20.

Once the image disc 14 has been mounted on the platen 34 such that the first image is aligned at the preselected position, the arm may be rotated by a control knob 39 to move the platen to a position within the housing 20 (FIG. 2) so that the first image on the image disc 14 will be aligned with the projector portion 31.

The projector portion 33 is employed to project the images printed on the image disc 14 onto a screen. In accordance with an important feature of the present invention, the lid or cover 44, of the housing 20, serves as the screen. The cover 44 is pivotally secured to the housing 20 by hinges 46. To allow the cover 44 to function as a screen for images projected thereon, the cover 44 includes a covering or a thin layer of reflective material 48 on the inside thereof which defines the screen.

To project the images from the image disc 14 onto the screen 48, the projector 33 includes a lamp 50 secured to the front wall of the housing 20 (FIG. 4). The light is focused and directed by a first stationary lens assembly 52 so as to be confined to an aligned beam of light aimed through the transparent image disc 14 mounted on the transparent platen 34. The lens assembly 52 includes a pair of lenses 54 and 56 that are mounted within a frame 58 secured to the front wall of the housing 20. The frame 58 includes apertures at the bottom 57 and top 59 to allow light to emanate from the lamp 50 and be directed and confined to a narrow beam that passes through the platen 34 and the image disc 14 thereby projecting the image.

Each image upon being projected by the light from the lamp 50 is directed onto the surface of a mirror 60 that is hingedly secured to the housing 20. The mirror 60 may be adjusted through the employment of a curvilinear friction and stop plate 62 to direct the image as projected from the image disc 14 at an angle onto the screen 48. The plate 62 allows the mirror 60 to be adjusted to vertically center the projected image onto the screen 48. In addition, when it is desired to store the toy 10, the mirror 60 may be lowered to allow the cover or lid 44 to be closed.

In order to focus the image on the screen 48, a focusing assembly generally designated by reference numeral 64 is provided as shown in FIGS. 4 and 6. The focusing assembly 64 includes a pair of lenses 66 and 68 that focus and further define the image projected from the disc 14. The focusing assembly 64 includes a cylindrical frame 70 that houses the lenses 66 and 68. The frame 70 includes a flange 72 (FIG. 6) mounted thereon to slideably mount the frame 70 within a vertical slot 76 in a vertical support flange 74 secured to the housing 20. As is known, the vertical movement of the lenses 66 and 68 relative to the image on the image disc 14 provides a focusing function.

The variation of the elevation of the lenses 66 and 68 is accomplished through the employment of a manually operable lever 78. The lever 78 is pivotally secured by a pin 77 to the vertical support flange 74. The upper end of the lever 78 extends through a slot 79 in the housing 20 and may be grasped by the operator.

The lever 78 further includes an inclined camming surface or slot 80 defined in an enlarged central web portion 81. An extended post or detent 82 on the flange 72 extends into and bears against the sides of the slot 80. When the lever 78 is pivoted relative to the support 74, the post 82 slides along the inclined surface of the slot 80 such that the vertical position of the lens frame 70 is varied within the slot 76 and, thus, with respect to the image disc 14, thereby focusing the image projected onto the screen. The frictional force developed between the post 82 and the sides of the camming surface of slot 80 is such that once the lever 78 is pivoted to the desired position wherein the image is focused, the frictional force will hold the post 82 so as to prevent further movement of the lever once the lever 78 is released by the operator thereby maintaining the image in focus.

As previously described, it is desirable that the image displayed on the screen 48 correspond to that portion of the recorded story being played by the phonograph 16. Accordingly, the rotation of the platen 34 and thus the rotation of the continuous images printed on the discs 14 are to be synchronized with the rotation of the turntable 18. To synchronize the rotation of the turntable 18 with the rotation of the platen 34, a gear assembly generally designated by the reference numeral 84 (FIG. 5) is included. The gear assembly 84 serves to couple the gear 30 mounted on the spindle 28 of the phonograph 16 to the carrier platen 34. In addition, since it is desired that the carrier platen 34 move at a slower rate than the rotation of the turntable 18 since there are fewer images on the disc 14 than grooves on the record 12, the gear assembly 84 also serves to reduce the speed at which the carrier platen 34 rotates relative to the turntable 18.

More specifically, the gear assembly 84 includes a first gear 86 rotatably mounted on the frame 29 of the phonograph 16. Integrally defined on gear 86 is a smaller gear 90. The smaller gear 90 rotates with the gear 86 and engages a third gear 92 also rotatably mounted on the frame 29. In this manner, there is a step down in the rotational speed of the gear 30 such that the gear 92 is rotating at a lesser, predetermined rate than the gear 30. Formed on or directly coupled to the gear 92 is another gear 94 of a smaller size than the gear 92. The last gear 94 serves to engage and rotate the platen 34.

To accomplish this latter function the platen 34 includes a ring gear 96 defined on its outer periphery of the platen 34. This gear 96 meshes with and is driven by the gear 94 when in the position as shown in solid lines of FIG. 2. Accordingly, the gear assembly 84 as described and through its mechanical or meshing engagement with the gear section 96 defined on the outer periphery of the platen 34 transmits the rotation of the turntable 18 to the carrier while at the same time reducing the rate of rotation of the platen 34 and synchronizing its rotation with the rotation of the turntable 18.

The operation of the phonograph device 10 commences with the placement of a record 12 onto the turntable 18. The tone arm 27 is then rotated to a position to engage the beginning of the recording on the record 12. An image disc 14 having images printed thereon that correspond to the story on the record 12 is positioned onto the platen 34 that has been swung outside of the housing 20. Once the image disc 14 is properly mounted onto the platen 34, the platen 34 is swung back into the housing 20 through the slot 42 to a position wherein the gear section 96 on the outer periphery of the platen 34 engages the gear 94.

The operator then turns on the lamp 50 through the employment of the switch 98 mounted on the top of the housing 20 and checks the proper alignment of the visual image disc 14. If it is not aligned properly, it can be manually adjusted. The phonograph is then started by the on-off, volume switch 100. Once the on-off switch 100 has been turned on, the motor is energized causing rotation of the turntable 18. Simultaneously, through the employment of the gear assembly 84, the carrier platen 34 is rotated at a slower rate of speed. As the turntable 18 rotates the tone arm 27 picks-up and amplifies the recorded story on the record 12. Additionally, the images that are printed in a continuous fashion on the disc 14 are projected onto the screen 48 as the image disc 14 is rotated across and over the lamp 50 and assembly 52. With the display of the first image onto the screen 48, the operator may focus the image by moving the lever 78. Additionally, the operator may position the image relative to the screen 48 by pivoting the mirror 60 through the employment of its hinge. In this fashion the operator is able to observe and hear a continuous story wherein the story as displayed visually on the screen is synchronized with the story recorded on the recording and played by the phonograph.

While the invention has been described with reference to details of the illustrated embodiments, it should be understood that such details are not intended to limit the scope of the invention as defined in the following claims.

We claim:
1. An audio-visual phonograph device, comprising:
a housing,
a cover pivotally mounted on said housing, said cover including means for displaying a light transmitted image,
a phonograph turntable rotatably mounted in said housing,
drive means for rotating said turntable,
reproducing means for phonographically transmitting sound from a record placed on said turntable,
at least one visual image disc having continuous images thereon generally about the periphery thereof,
a discrete image disc carrier rotatably mounted in said housing,
projecting means for projecting at least a portion of the images from said visual image disc onto said displaying means, gear means coupling said turntable to said disc carrier for synchronizing the rotation of said turntable and said carrier such that the carrier is driven at a continuous, predetermined rate of rotation whereby the sound transmitted by said transmitting means corresponds to the continuously moving image projected from said disc onto said displaying means and
means supporting said carrier for motion between a position wherein said carrier is coupled to said gear means and a position wherein said carrier extends outwardly of said housing to facilitate mounting of said disc onto said carrier.

2. The device set forth in claim 1 wherein said gear means includes a gear assembly between said turntable and said carrier.

3. The device of claim 2 wherein said gear assembly provides a step-down relationship so that said carrier rotates only one complete revolution during the play of a record.

4. The device set forth in claim 2 wherein said carrier comprises a plate including a gear section defined on the outer periphery thereof, said gear section being in meshing engagement with said gear assembly.

5. An audio-visual phonograph device in accordance with claim 4 wherein said turntable includes a spindle fixedly secured thereto and said gear assembly includes a first gear fixedly secured to said spindle for rotation therewith, a frame for rotatably supporting said spindle, a second gear rotatably supported by said frame, said second gear having a first section engaging said first gear and a second section, a third gear rotatably supported by said frame, said third gear having a first section engaging the second section of said second gear and a second section engaging said gear section of said plate.

6. The device set forth in claim 1 wherein said projecting means includes a lens assembly including at least one lens slidably mounted on said housing, said assembly further including a first frame member housing said lens, and a second frame member pivotally mounted on said housing, said second frame member including a cam surface in sliding engagement with a portion of said first frame member such that pivoting of said second frame member moves said first member to thereby focus an image projected from said disc onto said displaying means.

7. The device set forth in claim 6 wherein said projecting means includes a mirror pivotally mounted on said housing adjacent said lens assembly, said mirror being adjustable relative to said housing to reflect said image projected by said lens assembly onto said displaying means.

8. A toy picture projector and phonographic device comprising:
  a housing, said housing including means for displaying a projected image,
  a phonograph assembly mounted on said housing, said phonograph including a record turntable rotatably mounted on said housing, means for reproducing sound from a record positioned on said turntable, and means for rotating said turntable at a preselected rate of rotation,
  a picture projector mounted on said housing, said projector including an image disc carrier disposed at an elevation below the elevation of said record turntable adapted to carry a visual image disc, said disc including continuous images thereon generally about the periphery thereof, and a cantilevered arm supporting said carrier for rotation,
  a gear assembly mounted on said housing mechanically coupling said turntable and said carrier, said carrier including a gear section along its periphery, said gear section being in meshing engagement with said gear assembly to drive the carrier at a predetermined, constant rate of rotation,
  means mounting said cantilevered arm for movement between a play position wherein the gear section of said carrier engages said gear assembly and a load position wherein said carrier extends outwardly of said housing,
  means for projecting said images onto said displaying means, and
  a lens assembly secured to said housing for focusing said projected image onto said displaying means.

9. The device set forth in claim 8 wherein said lens assembly includes at least one lens, a lever pivotally secured to said housing, said lever including an inclined cam surface defined thereon, and a frame slidably mounted on said housing for mounting said lens; said frame including an extension in sliding contact with said cam surface such that pivotal movement of said lever relative to said housing imparts sliding movement of said frame relative to said housing thereby focusing said projected image.

10. The device set forth in claim 8 wherein said displaying means comprises a lid pivotally mounted on said housing including reflective material secured to one side thereof.

11. An assembly for focusing an image projected by a visual image projector and phonographic device, said device including a housing and a screen secured thereto for displaying said images, said device further including a record turntable and a recording pickup device for reproducing a recording from said record, said device also including a lamp and carrier mounted on said housing, said carrier being adapted to carry a disc of the type including continuous images thereon and adapted to rotate said images adjacent said lamp in order to project a portion of said image onto said screen, said focusing assembly comprising:
  a lever pivotally mounted on said housing, said lever including a bearing surface defined thereon,
  a supporting flange having a slot extending along its length,
  a focusing lens frame slidably mounted within the slot of said flange,
  said bearing surface being defined by an elongated slot extending at an angle inclined relative to the slot of said flange, and
  at least one focusing lens secured to said frame, said frame including a member slidably engaging said bearing surface whereby movement of said lever causes said frame member to slide along said surface moving said frame relative to said carrier thereby focusing each said projected image on said screen.

12. The assembly set forth in claim 11 wherein said device includes means for synchronizing the rotation of said turntable and said carrier, said synchronizing means including a gear section defined on the outer periphery of said carrier and a gear assembly mechanically coupling said gear section and said turntable to drive the carrier at a predetermined constant rate of rotation.

13. The assembly set forth in claim 11 further comprising a mirror hingedly secured to said housing for reflecting said projected image from said focusing assembly to said screen.

14. The assembly set forth in claim 11 wherein said screen comprises a cover coupled to said housing and reflective material secured thereon.

* * * * *